United States Patent
Hendricks et al.

3,906,063
Sept. 16, 1975

[54] DIPHOSPHONATE ESTERS HAVING DICARBAMIC ACID DIESTERS

[75] Inventors: Udo-Winfried Hendricks, Cologne; Klaus Walz, Berg. Neukirchen, both of Germany

[73] Assignee: Bayer Aktiengesellschaft, Leverkusen, Germany

[22] Filed: May 17, 1974

[21] Appl. No.: 470,825

[30] Foreign Application Priority Data
May 19, 1973  Germany.............................. 2325576

[52] U.S. Cl.............. 260/932; 106/15 FP; 117/136; 260/927 R; 260/968; 260/969; 260/970
[51] Int. Cl.²... C07F 9/40; C07F 9/38; D06C 27/00
[58] Field of Search.......................... 260/927 R, 932

[56] References Cited
UNITED STATES PATENTS
2,710,301  6/1955  Morris et al. ...................... 260/932

*Primary Examiner*—Anton H. Sutto
*Attorney, Agent, or Firm*—Plumley & Tyner

[57] ABSTRACT

New Dicarbamic acid diesters of the formula

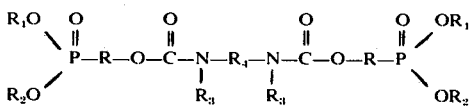

in which the substituents have the meaning given in the disclosure, their manufacture and use as flameproofing agents of textiles, especially for cellulose containing fibres, paper and plactics.

5 Claims, No Drawings

3,906,063

DIPHOSPHONATE ESTERS HAVING DICARBAMIC ACID DIESTERS

The invention relates to new dicarbamic acid diesters, containing phosphorus, of the formula $$\begin{array}{c}R_1O\\R_2O\end{array}\!\!>\!\!\overset{O}{\underset{\|}{P}}\!\!-\!\!R\!-\!\!O\!-\!\!\overset{O}{\underset{\|}{C}}\!\!-\!\!N\!-\!\!R_4\!-\!\!N\!-\!\!\overset{O}{\underset{\|}{C}}\!\!-\!\!O\!-\!\!R\!-\!\!\overset{O}{\underset{\|}{P}}\!\!<\!\!\begin{array}{c}OR_1\\OR_2\end{array} \quad (I)$$

in which
- R represents a $C_1$–$C_4$-alkylene radical which is optionally substituted by one or more halogen atoms, preferably chlorine atoms,
- $R_1$ and $R_2$ independently of one another represent a $C_1$–$C_4$-alkyl radical which is optionally substituted by halogen atoms, preferably chlorine atoms, or together with the oxygen atoms and the phosphorus atom form a 5-membered to 7-membered heterocyclic structure,
- $R_3$ is hydrogen, a hydroxymethyl group or a $C_1$–$C_4$-alkoxymethyl group, and
- $R_4$ is a —CH(OH)—CH(OH)— or especially a —CH($R_5$)—group in which
- $R_5$ preferably is hydrogen or an optionally halogen-substituted $C_1$–$C_6$-alkyl group or aryl group, a carboxyl group or a $C_1$–$C_4$-alkoxycarbonyl group, processes for their preparation and their use as flameproofing agents for textile materials, paper and plastics.

The compounds according to the invention, of the formula I, can be prepared according to various processes.

Process A:

This starts from monocarbamic acid esters of the formula $$\begin{array}{c}R_1O\\R_2O\end{array}\!\!>\!\!\overset{O}{\underset{\|}{P}}\!\!-\!\!R\!-\!\!O\!-\!\!\overset{O}{\underset{\|}{C}}\!\!-\!\!\underset{R_3}{N}\!H \qquad II$$

in which
R, $R_1$, $R_2$ and $R_3$ have the meaning indicated under the formula I.

These compounds, obtainable according to processes which are in themselves known, are reacted, again in a manner which is in itself customary, with aldehydes or compounds which split off aldehyde.

As aldehydes there may above all be mentioned aliphatic $C_1$–$C_6$-monoaldehydes, such as formaldehyde, acetaldehyde, chloral, propionaldehyde, butyraldehyde, glyoxylic acid and its esters with $C_1$–$C_4$-alkanols, especially the methyl ester, and also aromatic aldehydes, such as benzaldehyde, monochlorobenzaldehyde, dichlorobenzaldehyde and trichlorobenzaldehyde, and the dialdehyde glyoxal. As compounds which split off aldehyde, paraformaldehyde, trioxane and formaldehyde-dimethylacetal can in particular be used.

Process A is carried out, for example, by dissolving the compounds of the formula II in water or mixtures of water with water-miscible organic solvents, for example alcohols, such as methanol and ethanol, or ketones, such as acetone, adding catalytic amounts of acid, for example hydrochloric acid or sulphuric acid, and the aldehyde, to the solution, and storing the reaction mixture for several days at room temperature. The reaction time can be shortened by raising the temperature. The reaction of the compounds of the formula II with the aldehydes can also be carried out in an anhydrous medium, for example in water-immiscible organic solvents, such as benzene, toluene or xylene, and the water formed in the reaction can be distilled off azeotropically. In the case of the reaction of compounds of the formula II with glyoxal it is advisable to work in a neutral to weakly alkaline medium. In the case of using compounds of the formula II in which $R_3$ represents hydrogen, the compounds of the formula I obtained from the reaction with the aldehydes can subsequently be methylolated with formaldehyde in an alkaline medium, and the methylol compounds can be etherified with a lower aliphatic $C_1$–$C_4$-alcohol, for example methanol or ethanol, in an acid medium in a known manner.

Process B:

This starts from dicarbamic acid esters of the formula $$X\!-\!\!R'\!-\!\!O\!-\!\!\overset{O}{\underset{\|}{C}}\!\!-\!\!NH\!-\!\!R'_4\!-\!\!NH\!-\!\!\overset{O}{\underset{\|}{C}}\!\!-\!\!O\!-\!\!R'\!-\!\!X \qquad (III)$$

in which
- X represents a chlorine or bromine atom,
- $R'$ represents a $C_2$–$C_4$-alkylene radical and
- $R'_4$ represents a —CH($R_5'$—)—group in which
- $R_5'$ is hydrogen or a $C_1$–$C_6$-alkyl, aryl, carboxyl or $C_1$–$C_4$-alkoxycarbonyl group.

These compounds of the formula III are reacted with phosphorous acid trialkyl esters of the formula $$P\!\!<\!\!\begin{array}{c}OR_6\\OR_7\\OR_8\end{array} \qquad (IV)$$

in which
- $R_6$, $R_7$ and $R_8$ independently of one another represent a $C_1$–$C_4$ alkyl radical or
- $R_6$ and $R_7$ together with the oxygen atoms and the phosphorus atom form a 5-membered to 7-membered heterocyclic structure, at 100°–200°C, preferably 130°–180°C, optionally in the presence of diluents which are inert under the reaction conditions, and are optionally subsequently methylolated with formaldehyde in the customary manner, and the resulting methylol compounds are optionally etherified with $C_1$–$C_4$-alkanols in a known manner.

As examples of representatives of the compounds of the formula III there may be mentioned N,N'-methylene-bis-(carbamic acid 2-chloroethyl ester), N,N'-methylene-bis-(carbamic acid 2-bromoethyl ester), N,N'-methylene-bis-(carbamic acid 2-chloropropyl ester), N,N'-methylene-bis-(carbamic acid 3-chloropropyl ester) and N,N'-methylene-bis-(carbamic acid 2-bromobutyl ester).

As examples of phosphorous acid trialkyl esters of the formula IV there may be mentioned: trimethyl phosphite, triethyl phosphite, tri-n-propyl phosphite, tri-iso-propyl phosphite, tri-iso-butyl phosphite, dimethyl-ethyl-phosphite, 2-methoxy-1,3-dioxaphospholan and 2-ethoxy-4-methyl-1,3-dioxaphospholan.

In a preferred embodiment of the process B, N,N'-methylene-bis-(carbamic acid 2-chloroethyl ester) or N,N'-methylene-bis-(carbamic acid 2-bromoethyl ester) is reacted with trimethyl phosphite or triethyl phosphite, the product is subsequently optionally methylolated with formaldehyde and the methylol compounds are optionally etherified with methanol.

Process C:

This starts from dicarbamic acid esters of the formula

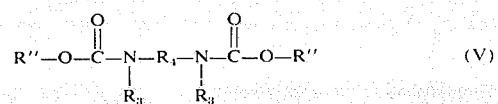

in which $R_3$ and $R_4$ have the meaning indicated under the formula I and

R'' represents a $C_2$–$C_4$ alkenyl radical;

these compounds of the formula V are reacted with phosphorous acid dialkyl esters of the formula

in which $R_6$ and $R_7$ have the meaning indicated under the formula IV, in the presence of radical-forming catalysts and are thereafter, if $R_3$ represented hydrogen, optionally methylolated with formaldehyde, and the methylol compounds are optionally etherified with $C_1$–$C_4$-alkanols.

The reaction of the compounds of the formula V with the phosphorous acid dialkyl esters of the formula VI is preferably carried out using excess phosphorous acid dialkyl ester at temperatures of 70°–160°C, preferably 100°–140°C. As radical-forming catalysts it is possible to use organic peroxides, for example dibenzoyl peroxide, di-tert.-butyl peroxide or dicumyl peroxide, or azo compounds, such as azo-isobutyric acid di-nitrile. The catalysts are employed in amounts of about 1–30 mol %, based on the weight of the compounds of the formula V.

In a preferred embodiment of the process C, N,N'-methylene-bis-(carbamic acid allyl ester) or N,N'-methylene-bis-(carbamic acid methallyl ester) is reacted with dimethyl phosphite or diethyl phosphite and the resulting dicarbamic acid ester is optionally subsequently methylolated with formaldehyde and the methylol compounds are optionally etherified with methanol.

The compounds of the formula I in which R, $R_1$, $R_2$, $R_3$ and $R_4$ have the meaning indicated in the table which follows may be mentioned as examples of representatives of the compounds of the formula I according to the invention:

Table

| R | $R_1$ | $R_2$ | $R_3$ | $R_4$ |
|---|---|---|---|---|
| —CH$_2$— | —CH$_3$ | —CH$_3$ | H | —CH$_2$— |
| —CH$_2$— | —CH$_3$ | —CH$_3$ | —CH$_2$—OCH$_3$ | —CH$_2$— |
| —CH$_2$— | —C$_2$H$_5$ | —C$_2$H$_5$ | H | —CH(OH)—CH(OH)— |
| —CH$_2$—CH$_2$— | —CH$_3$ | —CH$_3$ | H | —CH$_2$— |
| —CH$_2$—CH$_2$— | —CH$_3$ | —CH$_3$ | —CH$_2$OH | —CH$_2$— |
| —CH$_2$—CH$_2$— | —CH$_3$ | —CH$_3$ | —CH$_2$OCH$_3$ | —CH$_2$— |
| —CH$_2$—CH$_2$— | —CH$_3$ | —CH$_3$ | —CH$_2$—OCH$_3$ | —CH(OH)—CH(OH)— |
| —CH$_2$—CH$_2$ | —C$_2$H$_5$ | —C$_2$H$_5$ | —CH$_2$OCH$_3$ | —CH$_2$— |
| —CH$_2$—CH$_2$— | —CH$_3$ | —CH$_3$ | —CH$_2$—OCH$_3$ | CCl$_3$—CH< |
| —CH$_2$—CH$_2$— | —CH$_3$ | —CH$_3$ | H | CH$_3$OOC—CH< |
| —(CH$_2$)$_3$— | —CH$_3$ | —CH$_3$ | H | —CH$_2$— |
| —(CH$_2$)$_3$— | —CH$_3$ | —CH$_3$ | —CH$_2$—OH | —CH$_2$— |
| —(CH$_2$)$_3$— | —C$_2$H$_5$ | —C$_2$H$_5$ | H | —CH(OH)—CH(OH)— |
| —CH(CH$_3$)—CH$_2$— | —CH$_3$ | —CH$_3$ | —CH$_2$OH | —CH$_2$— |
| —(CH$_2$)$_3$ | —CH$_3$ | —CH$_3$ | —CH$_2$—OCH$_3$ | —CH$_2$— |
| —(CH$_2$)$_3$— | —CH$_3$ | —CH$_3$ | —CH$_2$OCH$_3$ | CH$_3$—CH< |
| —CH(CCl$_3$)— | —CH$_3$ | —CH$_3$ | —CH$_2$OCH$_3$ | —CH$_2$— |
| —CH$_2$— | | —CH$_2$—CH$_2$— | —CH$_2$—OCH$_3$ | —CH$_2$— |
| —CH$_2$—CH$_2$— | | —CH$_2$—CH$_2$— | —CH$_2$OCH$_3$ | —CH$_2$— |
| —CH$_2$—CH$_2$— | CH$_3$\>CH—<br>CH$_3$/ | CH$_3$\>CH—<br>CH$_3$/ | —CH$_2$OCH$_3$ | —CH$_2$— |
| BrCH$_2$—CHBr—CH | CH$_3$— | —CH$_3$ | —CH$_2$OCH$_3$ | —CH$_2$— |
| —CH$_2$—CH$_2$— | —CH$_3$ | —CH$_3$ | —CH$_2$—OH | —CH(C$_6$H$_5$)— |

The compounds according to the invention, of the formula I, are in the majority of cases highly viscous, colourless or pale-coloured liquids. They are outstandingly suitable for flameproofing fibre materials of natural or synthetic fibres, and plastics. An outstandingly wash-resistant flame-proof finish is obtained with the aid of the compounds according to the invention on textiles of fibre materials containing cellulose, such as cotton, linen, viscose and rayon and polyester-cotton mixtures.

The dicarbamic acid diesters according to the invention, of the formula I, are employed in an amount of about 8 to 60, preferably 10 to 40, % by weight based on the fibre material, when used as flameproofing agents for textile materials.

To carry out the finishing process, the textile materials are impregnated with solutions which contain, per litre, about 100–400g of the compounds according to the invention, of the formula I, and also, optionally, further finishing agents, such as creaseproofing agents, softeners, agents for conferring hydrophobic properties and agents for conferring oleophobic properties, and acid or latent acid condensation catalysts. The solvent used is preferably water, optionally mixed with water-miscible organic solvents, and optionally with the use of small amounts of emulsifiers. The fibre materials are impregnated with the finishing liquor in a known manner, for example by dipping, padding or spraying, squeezed out to a weight increase of about 80–150%, subsequently dried and thermofixed at 100°–200°C, preferably 140°–180°C.

The parts mentioned in the examples which follow are parts by weight unless otherwise stated.

EXAMPLE 1

25 parts of 38% strength formaldehyde solution and 1.5 ml of concentrated hydrochloric acid are added at room temperature to a solution of 145 parts of N-methoxymethyl-2-carbamyloxyethylphosphonic acid dimethyl ester, which has been prepared in a manner which is in itself known by reaction of 2-hydroxyethanephosphonic acid dimethyl ester with methoxymethyl isocyanate, in 180 ml of water. The reaction mixture is stored for 4 days at room temperature and subsequently first neutralised with sodium hydroxide solution and then freed from the water of reaction and the volatile constituents at 70°C in a vacuum of about 2 mm Hg. 136 parts of the compound of the formula

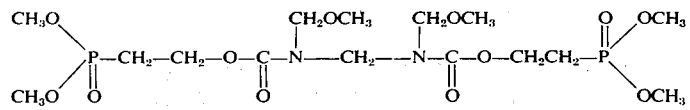

are obtained as a colourless, viscous liquid.
$C_{15}H_{32}N_2O_{12}P_2$; (molecular weight 494); $n_D^{20} = 1.4650$
Calculated: 36.4% C; 6.5% H; 5.7% N; 12.5% P;
Found: 35.8% C; 6.6% H; 5.8% N; 12.5% P

EXAMPLE 2

460 parts of trimethyl phosphite are added dropwise to 450 parts of N,N'-methylene-bis-(carbamic acid 2-chloroethyl ester), starting at 160°C. After completion of the addition, in the course of which the temperature was lowered to 140°C, the reaction mixture is stirred for a further 5 hours at 140°C. In the course thereof, 170 parts of methyl chloride distil off. The reaction mixture is then freed from all volatile constituents by heating to 120°–130°C in vacuo (2 mm Hg). 585 parts of the compound of the formula

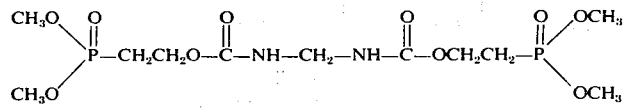

are obtained as a colourless, highly viscous liquid.
$C_{11}H_{24}N_2O_{10}P_2$ (molecular weight 406

Calculated: 32.5% C; 5.9% H; 6.9% N; 15.8% P;
Found: 32.4% C; 5.9% H; 7.3% N; 15.1% P The same compound was also prepared as follows:

114 parts of 2-carbamyloxyethane-phosphonic acid dimethyl ester and 23.7 parts of 38% strength aqueous formaldehyde solution were mixed with 90 parts of water, with the addition of 1.5 ml of concentrated hydrochloric acid, and the mixture was stored for 4 days at room temperature. The reaction mixture was then neutralised with dilute sodium hydroxide solution and freed from water by warming in vacuo. The compound was obtained in a yield of 118 parts, again as a colourless, highly viscous liquid.
Calculated: 32.5% C; 5.9% H; 6.9% N; 15.28% P;
Found: 31.6% C; 5.8% H; 5.7% N; 15.2% P

EXAMPLE 3

31 parts of dibenzoyl peroxide are added at room temperature to a solution of 645 parts of N,N'-methylene-bis-(carbamic acid allyl ester) in 1.980 parts of dimethyl phosphite and the mixture is then slowly introduced dropwise into a flask heated to 130°–135°C. After completion of the addition, the reaction solution is first stirred at 130°–135°C for 1 hour, then mixed with a further 31 parts of dibenzoyl peroxide, and again stirred for 5 hours at the same temperature. The excess dimethyl phosphite is then distilled off in vacuo (2 mm Hg) at 80°–90°C. 1,530 parts of the compound of the formula

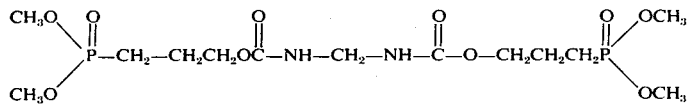

are obtained as a highly viscous, colourless liquid.
$C_{13}H_{28}N_2O_{10}P_2$ (molecular weight 434); $n_D^{20} = 1.4649$
Calculated: 35.9% C; 6.45% H; 6.45% N; 14.3% P;
Found: 34.9% C; 6.5% H; 5.9% N; 14.9% P

EXAMPLE 4

A solution of 100 parts of the compound described in Example 3 in 100 parts of water is adjusted to pH 9 with concentrated sodium hydroxide solution and 43 parts of 38% strength formaldehyde solution are then added at 60°C. After stirring for 1 hour at 60°–70°C, the water is distilled off at 40°–50°C, initially at 12–14 mm Hg and then at 2–5 mm Hg. 130 parts of the compound of the formula

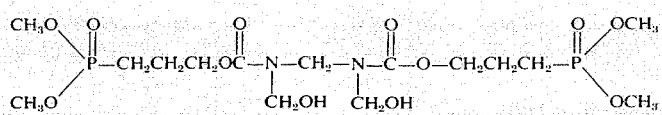

are obtained as a colourless, viscous liquid. $n_D^{20}$: 1.4720.

EXAMPLE 5

21 parts of 38% strength formaldehyde solution and 1.5 ml of concentrated hydrochloric acid are added to a solution of 115 parts of N-methoxymethyl-carbamyloxymethanephosphonic acid dimethyl ester in 90 ml of water at room temperature. The reaction mixture is stored for 4 days at room temperature, then neutralised with sodium hydroxide solution and freed from water and the volatile constituents in vacuo. 120 parts of the compound of the formula

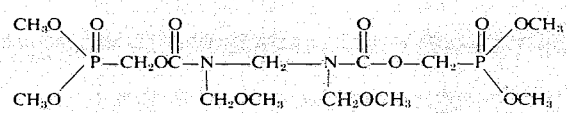

are obtained as a colourless, highly viscous liquid. $C_{13}H_{28}N_2O_{12}P_2$ (molecular weight: 466); $n_D^{20}$: 1.480
Calculated: 33.5% C; 6.0% H; 6.0% N; 13.1% P;
Found: 32.0% C; 5.7% H; 6.2% N; 13.5% P

EXAMPLE 6

A solution of 175 parts of the compound described in Example 2 in 80 parts of water is adjusted to pH 9 with sodium hydroxide solution and 50 parts of 38% strength formaldehyde solution are added at 60°–70°C. After stirring for 1 hour at 60°–70°C, the water is distilled off at 40°–50°C in a vacuum which is initially 14–15 mm Hg and then 2–5 mm Hg. 190 parts of the compound

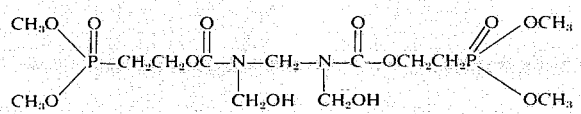

are obtained as a colourless, highly viscous paste.

EXAMPLE 7

A cotton furnishing fabric is impregnated with an aqueous liquor which contains, per litre, 400 g of the dicarbamic acid diester described in Example 1, 150 g of a trimethylolated melamine, 25 g of magnesium chloride, 5 g of citric acid and 1 g of the reaction product of 1 mol of nonyl phenol with 10 mols of ethylene oxide. The impregnated fabric is squeezed out to a weight increase of 90–100%, dried at 100°C for 10 minutes and condensed at 160°C for 5 minutes. The fabric is then washed with a dilute sodium carbonate solution at 40°C, and dried.

To test its flame-retardant finish, the fabric finished as described above is subjected to the vertical test according to DIN 53,906. The results of the test are summarised in the table which follows:

Table

|  | Burning length | |
|---|---|---|
|  | Warp | Weft |
| A untreated | burned away | |
| B finished according to Example 7 | 7.3 cm | 6.0 cm |
| C B, after 5 machine washes at the boil | 6.6 cm | 6.1 cm |

We claim:

1. Dicarbamic acid diesters of the formula

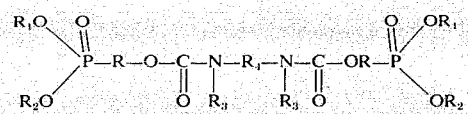

in which
R represents a $C_1$–$C_4$-alkylene radical which is optionally substituted by one or more halogen atoms,
$R_1$ and $R_2$ independently of one another represent a $C_1$–$C_4$-alkyl radical which is optionally substituted by halogen atoms or together with the oxygen atoms and the phosphorus atom form a 5-membered to b 7-membered heterocyclic structure,
$R_3$ represents hydrogen or a hydroxymethyl or $C_1$–$C_4$-alkoxymethyl group and
$R_4$ represents a —CH(OH)—CH(OH)— or a —CH($R_5$)— group,
in which
$R_5$ is hydrogen, an optionally halogen-substituted $C_1$–$C_6$-alkyl group or aryl group, a carboxyl group or a $C_1$–$C_4$-alkoxycarbonyl group.

2. Dicarbamic acid diesters according to claim 1, characterised in that
R represents the methylene, 1,2-ethylene or 1,3-propylene radical,
$R_1$ and $R_2$ represent methyl or ethyl and
$R_4$ represents the methylene radical.

3. Dicarbamic acid diesters according to claim 1 and 2, characterised in that
R represents the 1,2-ethylene or 1,3-propylene radical,
$R_1$ and $R_2$ represent methyl or ethyl,
$R_3$ represents hydrogen, hydroxymethyl or methoxymethyl and
$R_4$ represents the methylene radical.

4. Dicarbamic acid diesters according to claim 1 of the formula

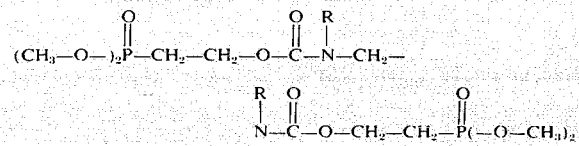

wherein R is H or $CH_2$—OH.

5. Dicarbamic acid diesters according to claim 1 of the formula

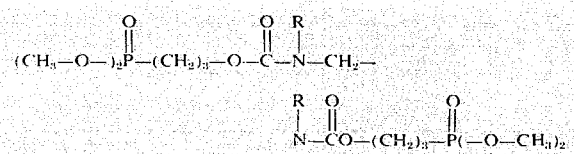

wherein R is H or $CH_2$—OH.

* * * * *

UNITED STATES PATENT AND TRADEMARK OFFICE
CERTIFICATE OF CORRECTION

PATENT NO. : 3,906,063
DATED : September 16, 1975
INVENTOR(S) : Udo-Winfried Hendricks et al It is certified that error appears in the above-identified patent and that said Letters Patent are hereby corrected as shown below:

Column 5, Example 2, last line after "406" there should be --- ) ---.

Column 6, line 15, "5.7%" should be ---6.7%---.

Column 8, Claim 1, line 23, after to "b" should be deleted.

*Signed and Sealed this*

*twenty-fourth* Day of *February 1976*

[SEAL]

Attest:

RUTH C. MASON
*Attesting Officer*

C. MARSHALL DANN
*Commissioner of Patents and Trademarks*